United States Patent
Yokoyama et al.

(10) Patent No.: US 10,336,836 B2
(45) Date of Patent: *Jul. 2, 2019

(54) PHOTOCURABLE RESIN COMPOSITION, INK, AND COATING

(71) Applicant: Osaka Soda Co., Ltd., Osaka-shi, Osaka (JP)

(72) Inventors: Katsutoshi Yokoyama, Osaka (JP); Shinichiro Ohashi, Osaka (JP); Masahiro Kohara, Osaka (JP); Satoshi Inoue, Osaka (JP)

(73) Assignee: Osaka Soda Co., Ltd., Osaka (JP)

( * ) Notice: Subject to any disclaimer, the term of this patent is extended or adjusted under 35 U.S.C. 154(b) by 33 days.

This patent is subject to a terminal disclaimer.

(21) Appl. No.: 15/517,868

(22) PCT Filed: Jan. 27, 2016

(86) PCT No.: PCT/JP2016/052375
§ 371 (c)(1),
(2) Date: Apr. 7, 2017

(87) PCT Pub. No.: WO2016/125663
PCT Pub. Date: Aug. 11, 2016

(65) Prior Publication Data
US 2017/0313796 A1    Nov. 2, 2017

(30) Foreign Application Priority Data
Feb. 3, 2015 (JP) .................. 2015-019430

(51) Int. Cl.
| | | |
|---|---|---|
| *C08F 20/40* | (2006.01) | |
| *C09D 7/40* | (2018.01) | |
| *C08F 2/44* | (2006.01) | |
| *C09D 131/02* | (2006.01) | |
| *C08F 263/06* | (2006.01) | |
| *C09D 11/101* | (2014.01) | |
| *C09D 11/106* | (2014.01) | |
| *C08F 291/00* | (2006.01) | |
| *C08F 2/48* | (2006.01) | |
| *C09D 129/06* | (2006.01) | |
| *C08F 222/26* | (2006.01) | |
| *C09J 131/02* | (2006.01) | |

(52) U.S. Cl.
CPC .............. *C08F 20/40* (2013.01); *C08F 2/44* (2013.01); *C08F 2/48* (2013.01); *C08F 222/26* (2013.01); *C08F 263/06* (2013.01); *C08F 291/00* (2013.01); *C09D 7/40* (2018.01); *C09D 11/101* (2013.01); *C09D 11/106* (2013.01); *C09D 129/06* (2013.01); *C09J 131/02* (2013.01)

(58) Field of Classification Search
CPC .......... C08F 2/48; C08F 20/40; C08F 222/26; C08F 2/44; C08F 263/06; C09D 129/06; C09D 7/40; C09D 11/101; C09D 11/106; C09J 131/02
See application file for complete search history.

(56) References Cited

U.S. PATENT DOCUMENTS

2016/0145392 A1    5/2016    Toda et al.

FOREIGN PATENT DOCUMENTS

| | | |
|---|---|---|
| JP | 52-004310 | 1/1977 |
| JP | 58-103519 | 6/1983 |
| JP | 1-131223 | 5/1989 |
| JP | 02-077414 | 3/1990 |
| JP | 2006-219525 | 8/2006 |
| JP | 2010-189537 | 9/2010 |
| JP | 2012-046612 | 3/2012 |
| JP | 2012-116868 | 6/2012 |
| JP | 2013124218 | 6/2013 |
| WO | 2014/203779 | 12/2014 |

OTHER PUBLICATIONS

Takayama, et al., "Studies on Resins of UV Curable Lithographic Inks", Journal of Photopolymer Science and vol. 2, No. 2, 1989, pp. 211-216.
U.S. Appl. No. 15/517,850, filed Apr. 7, 2017, US 2017/0313795, Nov. 2, 2017.

*Primary Examiner* — Sanza L. McClendon
(74) *Attorney, Agent, or Firm* — Hamre, Schumann, Mueller & Larson, P.C.

(57) ABSTRACT

An object of the present invention is to provide a photocurable resin composition that has excellent adhesion to plastic substrates and can form a composition with good compatibility. The present invention relates to a photocurable resin composition containing: an allylic polymer (A) produced by polymerization of an allylic compound represented by the formula (I) below; and a tackifier resin (B),

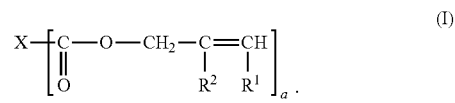

7 Claims, No Drawings

PHOTOCURABLE RESIN COMPOSITION, INK, AND COATING

TECHNICAL FIELD

The present invention relates to a photocurable resin composition containing an allylic polymer (A) and a tackifier resin (B), and also relates to an ink and a coating material including the resin composition. Specifically, the present invention relates to a photocurable resin composition having excellent adhesion to plastic substrates.

BACKGROUND ART

Various resin compositions that can be cured by light (e.g. ultraviolet rays) have been used in inks, coating materials, adhesives, photoresists, and other applications. For example, UV curable printing inks are highly valued because, e.g., they have a high cure rate so that they can be cured in a short time; they are environmentally friendly due to no use of solvents; and they can save resources and energy. Therefore, they are increasingly widely used in practice.

Among such resin compositions, those containing diallyl phthalate resins derived from diallyl phthalate (diallyl orthophthalate, diallyl isophthalate, or diallyl terephthalate) are used as UV offset inks for paper.

However, in offset ink applications, the incorporation of diallyl phthalate resins is known to result in insufficient adhesion to plastic substrates (see, for example, Patent Literature 1). These days, products of various types of plastic materials, including polyethylene terephthalate (PET) and polypropylene (PP), are on the market. Thus, there is a need to improve adhesion to plastic substrates with which diallyl phthalate resins have problems.

Patent Literature 2 describes that, among active energy ray-curable ink compositions each containing a photopolymerizable acrylate monomer, a pigment, a photoinitiator, and a petroleum-based resin which is soluble in the photopolymerizable acrylate monomer, those containing specific petroleum-based resins have excellent transferability and adhesion to olefin resin films such as polyethylene or polypropylene films. However, these active energy ray-curable ink compositions have a versatile problem in that the diallyl phthalate resins are compatible with limited petroleum-based resins.

CITATION LIST

Patent Literature

Patent Literature 1: JP S52-4310 A
Patent Literature 2: JP 2010-189537 A

SUMMARY OF INVENTION

Technical Problem

The present invention aims to provide a photocurable resin composition that has excellent adhesion to plastic substrates and can form a composition with good compatibility.

Solution to Problem

As a result of extensive studies, the present inventors have found that a photocurable resin composition which contains an allylic polymer (A) produced by polymerization of an allylic compound having a specific structure, and a tackifier resin (B) has excellent adhesion to plastic substrates and can form a composition with good compatibility, thereby achieving the present invention.

Specifically, the photocurable resin composition of the present invention contains: an allylic polymer (A) produced by polymerization of an allylic compound represented by the formula (I) below; and a tackifier resin (B),

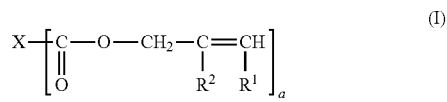

wherein $R^1$ and $R^2$ each represent H or $CH_3$; X represents an a-valent group having an unsubstituted saturated or partially unsaturated four- to eight-membered cyclic structure; and a represents 2 or 3.

A photocurable resin composition which contains an allylic polymer (A) produced by polymerization of an allylic compound of formula (I), and a tackifier resin (B) has excellent adhesion to plastic substrates.

Moreover, such a photocurable resin composition shows excellent adhesion particularly to polypropylene (PP) resin.

This is presumably because the allylic polymer (A) and PP resin have similar polarities and, further, the tackifier resin (B) and PP resin also have similar polarities, and therefore the combination of the allylic polymer (A) and the tackifier resin (B) in the photocurable composition is favorable for adhesion to PP resin.

Furthermore, the photocurable resin composition containing the allylic polymer (A) and the tackifier resin (B) in combination with other resin components can form a composition with good compatibility.

Thus, the photocurable resin composition is suitable as a component of inks or coating materials for PP resin, to which conventional diallyl phthalate resin compositions are difficult to closely adhere.

In the photocurable resin composition of the present invention, the X in formula (I) preferably has any of the following cyclic structures:

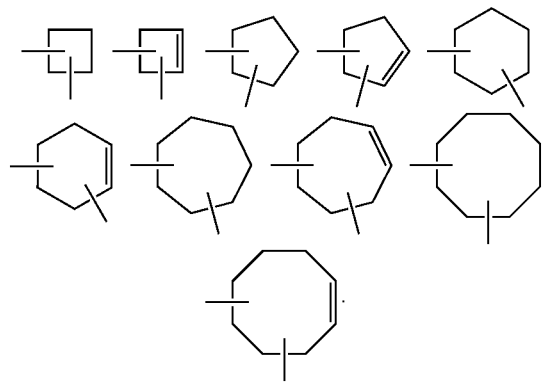

Preferably, the photocurable resin composition of the present invention further contains an ethylenically unsaturated compound (C).

The ethylenically unsaturated compound (C) has good compatibility with the allylic polymer (A) and the tackifier resin (B) and is thus suitable to provide a composition with good compatibility.

Preferably, the photocurable resin composition of the present invention further contains a photopolymerization initiator.

The composition containing a photopolymerization initiator can be smoothly polymerized by exposure to light, so that a higher molecular weight polymer can be produced in a short time.

The ink of the present invention includes the photocurable resin composition of the present invention.

This ink is suitable for printing on plastic substrates, and especially on PP resin substrates (e.g. sheets or films)

The coating material of the present invention includes the photocurable resin composition of the present invention.

This coating material is suitable for painting on plastic substrates, and especially on PP resin substrates (e.g. sheets or films).

The coating material of the present invention is preferably an overprint varnish.

Advantageous Effects of Invention

The present invention provides a photocurable resin composition which has good adhesion to synthetic polymer substrates, particularly plastic substrates, when it is used as a component of inks, coating materials, adhesives, or photoresists, and further which is excellent in compatibility.

DESCRIPTION OF EMBODIMENTS

The present invention is described in detail below.
Allylic Polymer (A)

The photocurable resin composition of the present invention contains an allylic polymer (A) produced by polymerization of an allylic compound represented by the following formula (I):

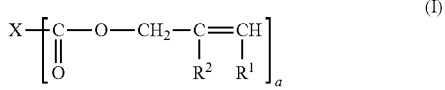

wherein $R^1$ and $R^2$ each represent H or $CH_3$; X represents an a-valent group having an unsubstituted saturated or partially unsaturated four- to eight-membered cyclic structure; and a represents 2 or 3.

Preferred examples of X in formula (I) include those having the following cyclic structures:

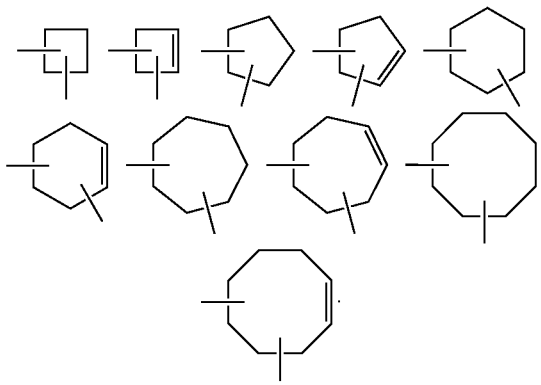

More preferred examples of X in formula (I) include those having the following cyclic structures:

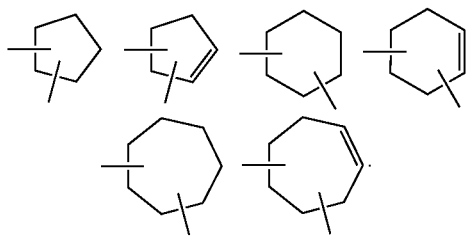

Further more preferred examples of X in formula (I) include those having the following cyclic structures:

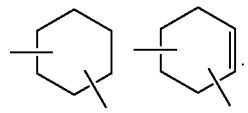

The X may be of various types and may have a cyclic structure other than those mentioned above. When X has a partially unsaturated cyclic structure, the number of double bonds in the cyclic structure is not limited to one, and may be two or more. However, X does not have an aromatic six-membered cyclic structure.

The X may be intramolecularly crosslinked. Examples of the intramolecularly crosslinked X include adamantane, norbornene, and norbornane.

Since X is an a-valent group where a is 2 or 3, X is a bivalent or trivalent group. A number "a (2 or 3)" of allyl ester groups [—CO—O—$CH_2$—$CR^2$=$CHR^1$] shown in formula (I) are bound to the cyclic structure of X.

Any combination of the positions of the allyl ester groups [—CO—O—$CH_2$—$CR^2$=$CHR^1$] substituted on the ring of X can be used. The allylic compound may be a mixture of compounds that differ in the combination of substitution positions. Particularly when two allyl ester groups are bound to a six-membered X, the two allyl ester groups may be in the ortho, meta, or para orientation, preferably in the ortho or para orientation.

Specific examples of the allylic compound of formula (I) include diallyl 1,2-cyclohexanedicarboxylate, diallyl 1,3-cyclohexanedicarboxylate, diallyl 1,4-cyclohexanedicarboxylate, diallyl 4-cyclohexene-1,2-dicarboxylate, and diallyl 2-cyclohexene-1,2-dicarboxylate. Preferred of these are diallyl 1,2-cyclohexanedicarboxylate, diallyl 4-cyclohexene-1,2-dicarboxylate, and diallyl 1,4-cyclohexanedicarboxylate, with diallyl 1,2-cyclohexanedicarboxylate being more preferred.

An allylic polymer (A) produced by polymerization of at least one compound selected from the group consisting of the aforementioned allylic compounds may be used in the photocurable resin composition. Moreover, copolymers produced by copolymerization of the allylic compound of formula (I) and other polymerizable compounds may be used in the photocurable resin composition. Examples of copolymerizable compounds include 3-methyl-hexahydro-1,2-diallyl phthalate, 4-methyl-hexahydro-1,2-diallyl phthalate, 3-methyl-1,2,3,6-tetrahydro-1,2-diallyl phthalate, and 4-methyl-1,2,3,6-tetrahydro-1,2-diallyl phthalate.

The specific exemplary allylic compounds of formula (I) may be produced, for example, by an esterification reaction between cyclohexanedicarboxylic acid or cyclohexanedicarboxylic anhydride and allyl alcohol or allyl chloride, or an esterification reaction between cyclohexenedicarboxylic acid or cyclohexenedicarboxylic anhydride and allyl alcohol or allyl chloride.

Commercial products of the specific exemplary allylic compounds of formula (I) may also be used.

The allylic compound of formula (I) may be polymerized by any method, including usual polymerization reactions. An appropriate polymerization initiator, if needed, may be added in the polymerization reaction. The use of a polymerization initiator allows for production of a higher molecular weight polymer in a short time.

Examples of the polymerization initiator used in the polymerization reaction of the allylic compound include azo initiators such as azobisisobutyronitrile and dimethyl 2,2'-azobisisobutyrate; peroxide initiators such as ketone peroxides, peroxy ketals, hydroperoxides, dialkyl peroxides, diacyl peroxides, peroxy dicarbonates, peroxy esters, and benzoyl peroxide; and photopolymerization initiators, including: acetophenone initiators such as 2-methyl-1-[4-(methylthio)phenyl]-2-morpholinopropane-1-one and 1-hydroxycyclohexyl phenyl ketone; benzoin initiators such as benzoin and benzoin ethyl ether; benzophenone initiators such as benzophenone; phosphorus initiators such as acylphosphine oxide; sulfur initiators such as thioxanthone; and benzil initiators such as benzil and 9,10-phenanthrenequinone.

The amount of the polymerization initiator relative to 100 parts by weight of the allylic compound of formula (I) as a monomer is preferably 5.0 parts by weight or less, more preferably 3.0 parts by weight or less. Moreover, the amount is particularly preferably 0.001 to 3.0 parts by weight.

The reaction temperature during the polymerization is preferably 60 to 240° C., e.g. 80 to 220° C. The reaction time is preferably 0.1 to 100 hours, e.g. 1 to 30 hours.

An allylic polymer (A) having a monomer unit based on the allylic compound of formula (I) can be prepared by polymerization of the allylic compound of formula (I) as described above or by other methods.

The amount of the monomer unit based on the allylic compound of formula (I), based on 100% by weight of the allylic polymer (A), is preferably 20% by weight or more, more preferably 50% by weight or more, further more preferably 80% by weight or more, particularly preferably 98% by weight or more, and may be 100% by weight.

The allylic polymer (A) preferably has a weight average molecular weight of 300,000 or less, more preferably 200,000 or less. The weight average molecular weight is further preferably 2,000 to 150,000, particularly preferably 5,000 to 140,000.

The amount of the allylic polymer (A) in the photocurable resin composition of the present invention is preferably 1% to 50% by weight, more preferably 1% to 40% by weight, further more preferably 1% to 30% by weight of the total amount of the photocurable resin composition. When a tackifier resin (B) and an ethylenically unsaturated compound (C), which will be described below, are added to the allylic polymer (A) within the range indicated above, they can be maintained sufficiently soluble so that the composition has excellent compatibility.

Tackifier Resin (B)

Examples of tackifier resins (B) that can be used in the photocurable resin composition of the present invention include unsaturated polyester resin, polyamide resin, epoxy resin, phenolic resin, vinyl chloride resin, vinyl acetate resin, urethane resin, ABS resin, AS resin, AAS resin, ethylene/vinyl chloride copolymer resin, butyral resin, ethylene/vinyl acetate copolymer resin, polyimide resin, polyacetal resin, polyethylene resin, polycarbonate resin, styrene resin, styrene-maleic acid resin, polysulfone resin, melamine resin, urea resin, xylene resin, coumarone resin, ketone resin, maleic acid resin, polyvinyl alcohol, polyvinyl ether, polyterpene resin, terpene phenolic resin, and acrylic resin.

For increased adhesion to olefin resin films such as polypropylene films, resins with low polarity are preferred among these. More preferred are those having a SP value, which is a measure of polarity, of 7.0 to 10.0, furthermore preferably 8.0 to 10.0, and particularly preferably 9.0 to 10.0.

Examples of such resins include polyethylene resin (SP value: 8.1), styrene resin (SP value: 9.1), vinyl acetate resin (SP value: 9.4), vinyl chloride resin (SP value: 9.6), polycarbonate resin (SP value: 9.8), and styrene-maleic acid resin (SP value: 9.85).

The SP value can be calculated by the Fedors method described in Polymer Engineering and Science, 14, (2), 147 (1974).

For increased adhesion to olefin resin films such as polypropylene films and in view of compatibility with the allylic polymer (A) and the ethylenically unsaturated compound (C) to which it is added in the photocurable resin composition, the resin is preferably a resin containing a benzene ring, more preferably a styrene-based resin having a styrene-based monomer unit. Examples of the styrene-based resin include AS resin, ABS resin, styrene resin, and styrene-maleic acid resin, with styrene resin or styrene-maleic acid resin being particularly preferred.

The amount of the tackifier resin (B) contained in the photocurable resin composition is preferably 50 to 1,000 parts by weight, more preferably 100 to 900 parts by weight, particularly preferably 200 to 800 parts by weight, relative to 100 parts by weight of the allylic polymer (A) in the photocurable resin composition. When the amount is within the range indicated above, the composition has sufficient adhesion to plastic substrates, and the allylic polymer (A) and the tackifier resin (B) are maintained sufficiently soluble so that the composition has excellent compatibility. Furthermore, when the ethylenically unsaturated compound (C) is added, they can be maintained sufficiently soluble.

Ethylenically Unsaturated Compound (C)

The photocurable resin composition of the present invention preferably contains an ethylenically unsaturated compound (C) that can be cured by exposure to light. The ethylenically unsaturated compound (C) preferably has 1 to 20, more preferably 1 to 10, further more preferably 2 to 6 carbon-carbon double bonds. The ethylenically unsaturated compound (C) may be, for example, a (meth)acrylic acid ester compound, a (meth)allyl compound, or a vinyl compound. Also, the ethylenically unsaturated compound may be a mixture of two or more compounds.

Examples of the (meth)acrylic acid ester compound include (meth)acrylic acid ester compounds of alcohols such as pentaerythritol, dipentaerythritol, trimethylolpropane, ditrimethylolpropane, neopentyl glycol, 1,6-hexanediol, glycerol, polyethylene glycol, or polypropylene glycol, and alkylene oxide (e.g. ethylene oxide, propylene oxide) adducts of these (meth)acrylic acid ester compounds; (meth)acrylic acid ester compounds of alkylene oxide (e.g. ethylene oxide, propylene oxide) adducts of bisphenols such as bisphenol A or bisphenol F; (meth)acrylic acid ester compounds such as epoxy (meth)acrylate, urethane (meth)acrylate, and alkyd (meth)acrylate; and (meth)acrylic acid ester compounds such as epoxidized soybean oil acrylate. Preferred are (meth)acrylic acid ester compounds of alcohols such as pentaerythritol, dipentaerythritol, trimethylolpropane, ditrimethylolpropane, neopentyl glycol, 1,6-hexanediol, glycerol, polyethylene glycol, or polypropylene glycol, and alkylene oxide (e.g. ethylene oxide, propylene oxide) adducts of these (meth)acrylic acid ester compounds. More preferred are (meth)acrylic acid ester compounds of alcohols such as pentaerythritol, dipentaerythritol, trimethylolpropane, or ditrimethylolpropane, and alkylene oxide (e.g. ethylene oxide, propylene oxide) adducts of these (meth) acrylic acid ester compounds.

Examples of the (meth)allyl compound include di(meth) allyl phthalate and tri(meth)allyl isocyanurate.

Examples of the vinyl compound include styrene, divinylbenzene, N-vinylpyrrolidone, and vinyl acetate.

In view of compatibility with the allylic polymer (A) and curability in photo-curing, ditrimethylolpropane tetraacrylate or trimethylolpropane triacrylate is preferred among these, with ditrimethylolpropane tetraacrylate being more preferred.

The amount of the ethylenically unsaturated compound (C) contained in the photocurable resin composition of the present invention is preferably 50 to 1,000 parts by weight, more preferably 100 to 950 parts by weight, further more preferably 250 to 950 parts by weight, relative to 100 parts by weight of the allylic polymer (A) in the photocurable resin composition.

The amount of the ethylenically unsaturated compound (C) to be contained in the photocurable resin composition is preferably added so that the photocurable resin composition has a viscosity in the range of 100 to 300 Pa·s (25° C.). Specifically, the ratio of the tackifier resin (B) to the ethylenically unsaturated compound (C) (tackifier resin (B): ethylenically unsaturated compound (C)) added to the photocurable resin composition is preferably in the range of 10:90 to 70:30, more preferably 20:80 to 60:40.

Other Additives

The photocurable resin composition of the present invention may contain a polymerization initiator, and in particular preferably a photopolymerization initiator. Examples of photopolymerization initiators that may be contained in the photocurable resin composition include acetophenone initiators such as 2-methyl-1-[4-(methylthio)phenyl]-2-morpholinopropane-1-one and 1-hydroxycyclohexyl phenyl ketone; benzoin initiators such as benzoin and benzoin ethyl ether; benzophenone initiators such as benzophenone; phosphorus initiators such as acylphosphine oxide; sulfur initiators such as thioxanthone; and benzil initiators such as benzil and 9,10-phenanthrenequinone.

The amount of the photopolymerization initiator contained in the photocurable resin composition is preferably in the range of 0.1% to 15% by weight, more preferably 0.5% to 12% by weight, further more preferably 1% to 10% by weight of the total photocurable resin composition.

A photoinitiation aid (e.g. an amine photoinitiation aid such as triethanolamine) may be used in combination in the photocurable resin composition.

The amount of the photoinitiation aid is preferably in the range of 0.1% to 5% by weight, more preferably 0.5% to 3% by weight of the total photocurable resin composition.

The photocurable resin composition of the present invention may contain various additives depending on the purpose, and examples of the additives include stabilizers (e.g. polymerization inhibitors such as hydroquinone and methoquinone), coloring agents such as pigments (e.g. cyanine blue, disazo yellow, carmine 6b, lake red C, carbon black, titanium white), fillers, and viscosity modifiers. The amount of the stabilizer contained in the photocurable resin composition is preferably in the range of 0.01% to 2% by weight, more preferably 0.1% to 1% by weight of the total photocurable resin composition.

The amount of the coloring agent is preferably in the range of 1% to 50% by weight, more preferably 1% to 45% by weight of the total photocurable resin composition.

The photocurable resin composition of the present invention can be prepared by mixing an allylic polymer (A) with a tackifier resin (B) and optionally an ethylenically unsaturated compound (C) as well as a photopolymerization initiator, a photoinitiation aid, and additives (e.g. a stabilizer, a pigment). The photocurable resin composition of the present invention is cured by exposure to light. The light used in the curing is typically ultraviolet rays.

The curing reaction of the photocurable resin composition may be carried out with any curing apparatus under any curing condition, and methods commonly used for photocuring reactions may be used.

The photocurable resin composition of the present invention can be used in any application. It may be used in various technical fields, such as inks (e.g. printing inks such as photocurable printing inks for lithography, silk screen printing inks, and gravure inks), coating materials (e.g. coating materials for paper, plastics, metals, wood, or other substrates, such as overprint varnishes), adhesives, and photoresists.

An ink including the photocurable resin composition of the present invention is the ink of the present invention. A coating material including the photocurable resin composition of the present invention is the coating material of the present invention. The coating material of the present invention is preferably an overprint varnish.

For example, the ink may typically be produced as follows. An allylic polymer (A), a tackifier resin (B), and a stabilizer or the like are dissolved in an ethylenically unsaturated compound (C) with stirring at 60° C. to 100° C. to prepare a varnish. The varnish is mixed with a pigment, a photopolymerization initiator, and other additives with stirring in a butterfly mixer and then milled using, for example, a three-roll mill to obtain an ink.

An overprint varnish can be produced in the same manner as described for the ink with the exception of not using any pigment.

EXAMPLES

The present invention is described in greater detail below referring to, but not limited to, examples.

Measurement of Weight Average Molecular Weight (Mw) and Molecular Weight Distribution (Mw/Mn) of Allylic Polymers Weight average molecular weight (Mw) and molecular weight distribution (Mw/Mn) were measured by GPC. The Mw and Mn are a weight average molecular weight and number average molecular weight, respectively, relative to polystyrene standards.

Column: Shodex KF-806L, KF-804, KF-803, KF-802, and KF-801 connected in series
Flow rate: 1.0 mL/min
Temperature: 40° C.
Detection: RID-6A
Sample: A measurement sample was prepared by dissolving 20 mg of a sample in 10 mL of tetrahydrofuran.

Production Example 1: Synthesis of Diallyl 1,2-cyclohexanedicarboxylate Polymer

Diallyl 1,2-cyclohexanedicarboxylate was prepared by an esterification reaction between cyclohexanedicarboxylic anhydride and allyl alcohol.

To a 3 L separable flask were added 2,400 g of diallyl 1,2-cyclohexanedicarboxylate and 60 g of benzoyl peroxide, followed by stirring with heat at 80° C. After 2.5 hours of reaction, the reaction mixture was cooled to 30° C. After the cooling, methanol was added to the flask to precipitate a polymer. The polymer was dried under reduced pressure at 40° C. for 16 hours to obtain a polymer (amount produced: 408 g, yield: 17%, Mw=32,000, Mw/Mn=2.8), which was used as Polymer 1.

Examples 1 and 2 and Comparative Examples 1 to 3

Photocurable resin compositions with the formulations described in Table 1 were prepared and evaluated for their properties.

1) Evaluation of Compatibility of Photocurable Resin Compositions

The allylic polymer (A) prepared in Production Example 1 or DAP resin, tackifier resins (B), an ethylenically unsaturated compound (C), and a polymerization inhibitor were added in the formulation amounts indicated in Table 1 and mixed with heat at 100° C. to prepare photocurable resin compositions. The photocurable resin compositions were cooled to room temperature and then allowed to stand overnight. Thereafter, the appearance of each composition was evaluated for transparency to determine the compatibility. The compositions having a transparent appearance after cooling were rated as "Good", and those having a cloudy appearance were rated as "Poor". Table 2 shows the results.

TABLE 1

| | | Example 1 | Example 2 | Comparative Example 1 | Comparative Example 2 | Comparative Example 3 |
|---|---|---|---|---|---|---|
| Allylic polymer (A) or | Polymer 1 | 10 | 7.5 | — | — | 30 |
| DAP resin | DAP resin | — | — | 10 | 30 | — |
| Tackifier resin (B) | Piccolastic A75 | 30 | — | 30 | — | — |
| | SMA2625 | — | 22.5 | — | — | — |
| Ethylenically unsaturated compound (C) | SR355 | 60 | 70 | 60 | 70 | 70 |
| Polymerization inhibitor | Irganox 1076 | 0.3 | 0.3 | 0.3 | 0.3 | 0.3 |

The components other than Polymer 1 listed in Table 1 are described below.

The formulation amounts indicated in Table 1 are expressed in parts by weight.

DAP resin: diallyl phthalate resin available from Osaka Soda Co., Ltd.

Piccolastic A75: Styrene resin available from Eastman Chemical Company

SMA2625: styrene-maleic acid resin available from CRAY VALLEY

SR355: ditrimethylolpropane tetraacrylate available from Sartomer

Irganox 1076: octadecyl-3-(3,5-di-t-butyl-4-hydroxyphenyl)propionate available from BASF Japan 2) Adhesion Test To each of the photocurable resin compositions prepared in 1) Evaluation of compatibility of photocurable resin compositions was added Irgacure 907 (2-methyl-1-[4-(methylthio)phenyl]-2-morpholinopropane-1-one available from BASF Japan) as a photopolymerization initiator, and they were mixed with heat to prepare a sample for an adhesion test.

The amount of the photopolymerization initiator was adjusted to 5 parts by weight relative to 100 parts by weight of the total of the allylic polymer (A) or DAP resin, the tackifier resin (B), and the ethylenically unsaturated compound (C) in the photocurable resin composition.

The prepared samples for an adhesion test were coated on a plastic film (polypropylene substrate, highly transparent cast PP sheet available from Tatsuta Chemical Co., Ltd., trade name: High P Crystal ST-500, thickness: 0.3 mm) using an RI tester, followed by being cured using a metal halide lamp with an output of 120 W/cm (distance to lamp: 11 cm, a plurality of passes at a conveyor speed of 5 m/min until the coated film became tack-free). The UV curing apparatus used was a conveyor-type UV curing apparatus available from Eye Graphics Co., Ltd. An 18 mm width strip of Cellotape (registered trademark) (Nichiban Co., Ltd., product No. LP-18, adhesive force: 4.01 N/10 mm) was attached to the resulting coated films. After strong rubbing with a thumb five times, the Cellotape (registered trademark) strip was peeled. The evaluation criteria are described below. Table 2 shows the results.

It should be noted that the photocurable resin composition of Comparative Example 1 had poor compatibility and could not be subjected to an adhesion test (the evaluation result is indicated with the symbol "-").

5: The coated film was not detached by rapid peeling.
4: The coated film was not detached at all by gradual peeling but was slightly detached by rapid peeling.
3: The coated film was not detached at all by gradual peeling but was detached by rapid peeling.
2: Approximately 50% of the coated film was detached even by gradual peeling.
1: The coated film was detached even by gradual peeling.

TABLE 2

| | Example 1 | Example 2 | Comparative Example 1 | Comparative Example 2 | Comparative Example 3 |
|---|---|---|---|---|---|
| Compatibility | Good | Good | Poor | Good | Good |
| Adhesion | 3 | 4 | — | 1 | 2 |

A comparison between Example 1 and Comparative Example 1 reveals that a combination of Polymer 1, which was an allylic polymer (A) produced by polymerization of an allylic compound of formula (I), and a tackifier resin (B) had better compatibility with an ethylenically unsaturated compound (C) than a combination of DAP resin and the tackifier resin (B). Moreover, as shown by comparison of Examples 1 and 2 with Comparative Examples 2 and 3, the combined use of Polymer 1, which was an allylic polymer (A) produced by polymerization of an allylic compound of formula (I), and a tackifier resin (B) also provided better adhesion to a polypropylene sheet, to which conventional photocurable compositions prepared from diallyl phthalate resins are difficult to adhere, as compared to when DAP resin or Polymer 1 alone was used.

INDUSTRIAL APPLICABILITY

The photocurable resin composition of the present invention can be used in inks (e.g. offset inks), coating materials, adhesives, photoresists, and other applications for plastic substrates.

The invention claimed is:

1. A photocurable resin composition, comprising:
   an allylic polymer (A) produced by polymerization of an allylic compound represented by the formula (I) below; and
   a tackifier resin (B),

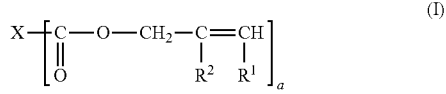

wherein $R^1$ and $R^2$ each represent H or $CH_3$; X represents an a-valent group having an unsubstituted saturated or partially unsaturated four- to eight-membered cyclic structure; and a represents 2 or 3.

2. The photocurable resin composition according to claim 1, wherein the X in formula (I) has any of the following cyclic structures:

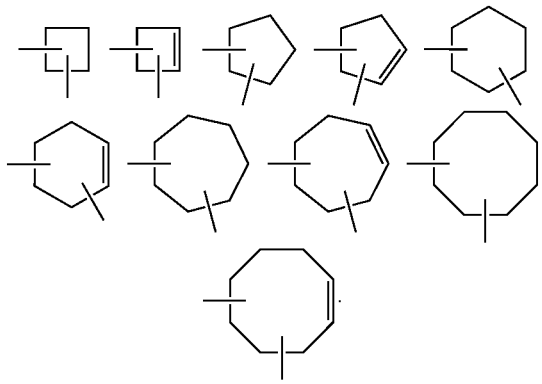

3. The photocurable resin composition according to claim 1, further comprising an ethylenically unsaturated compound (C).

4. The photocurable resin composition according to claim 1, further comprising a photopolymerization initiator.

5. An ink, comprising the photocurable resin composition according to claim 1.

6. A coating material, comprising the photocurable resin composition according to claim 1.

7. The coating material according to claim 6, which is an overprint varnish.

* * * * *